(12) United States Patent
Takahashi

(10) Patent No.: US 6,202,073 B1
(45) Date of Patent: *Mar. 13, 2001

(54) DOCUMENT EDITING SYSTEM AND METHOD

(75) Inventor: Fumiaki Takahashi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,104

(22) Filed: May 30, 1997

(30) Foreign Application Priority Data

Jun. 4, 1996 (JP) .................................................. 8-162475

(51) Int. Cl.[7] .............................. G06F 15/00; G09G 5/00
(52) U.S. Cl. .......................... 707/517; 707/526; 345/118
(58) Field of Search ................................... 707/517, 520, 707/523, 526, 530, 104; 345/418, 433, 112, 115, 116–118, 121, 127, 133, 326, 327

(56) References Cited

U.S. PATENT DOCUMENTS

| | | | |
|---|---|---|---|
| 5,031,121 | * 7/1991 | Iwai et al. ............................. | 364/523 |
| 5,337,406 | * 8/1994 | Takakura et al. .................... | 395/148 |
| 5,377,330 | * 12/1994 | Kubota et al. ....................... | 395/275 |
| 5,522,022 | * 5/1996 | Rao et al. ............................ | 345/440 |

* cited by examiner

Primary Examiner—Joseph H. Feild
Assistant Examiner—Alford W. Kindred
(74) Attorney, Agent, or Firm—Fitzpatrick, Cella, Harper & Scinto

(57) ABSTRACT

A document editing system edits a document which includes image data. A processing script for editing the image data is either selective or nonselective. If the processing script is nonselective, image editing is automatically performed without user intervention. If the processing script is selective, a user selects a preferred image while observing a certain number of automatically edited images obtained as a result of processing. The processing script assigns a template for providing a minimum user interface, which is selectively displayed for image editing in accordance with the processing script. Thus, a user who is unfamiliar with image editing can easily perform such editing.

27 Claims, 19 Drawing Sheets

FIG.8(a)

PROCESSING PROCEDURE 1:
GRADATION PROCESSING,PARAMETER 1 = 10;
ILLUSTRATION,PARAMETER 1 = 20;
PROCESSING PROCEDURE 2:
SHARPENING PROCESSING,PARAMETER 1 = 10;
NOISE PROCESSING,PARAMETER 1 = 15,PARAMETER 2 = 30

FIG.8(b)

PROCESSING PROCEDURE 1:
GRADATION PROCESSING,PARAMETER 1 = 10;
ILLUSTRATION,PARAMETER 1 = 20;

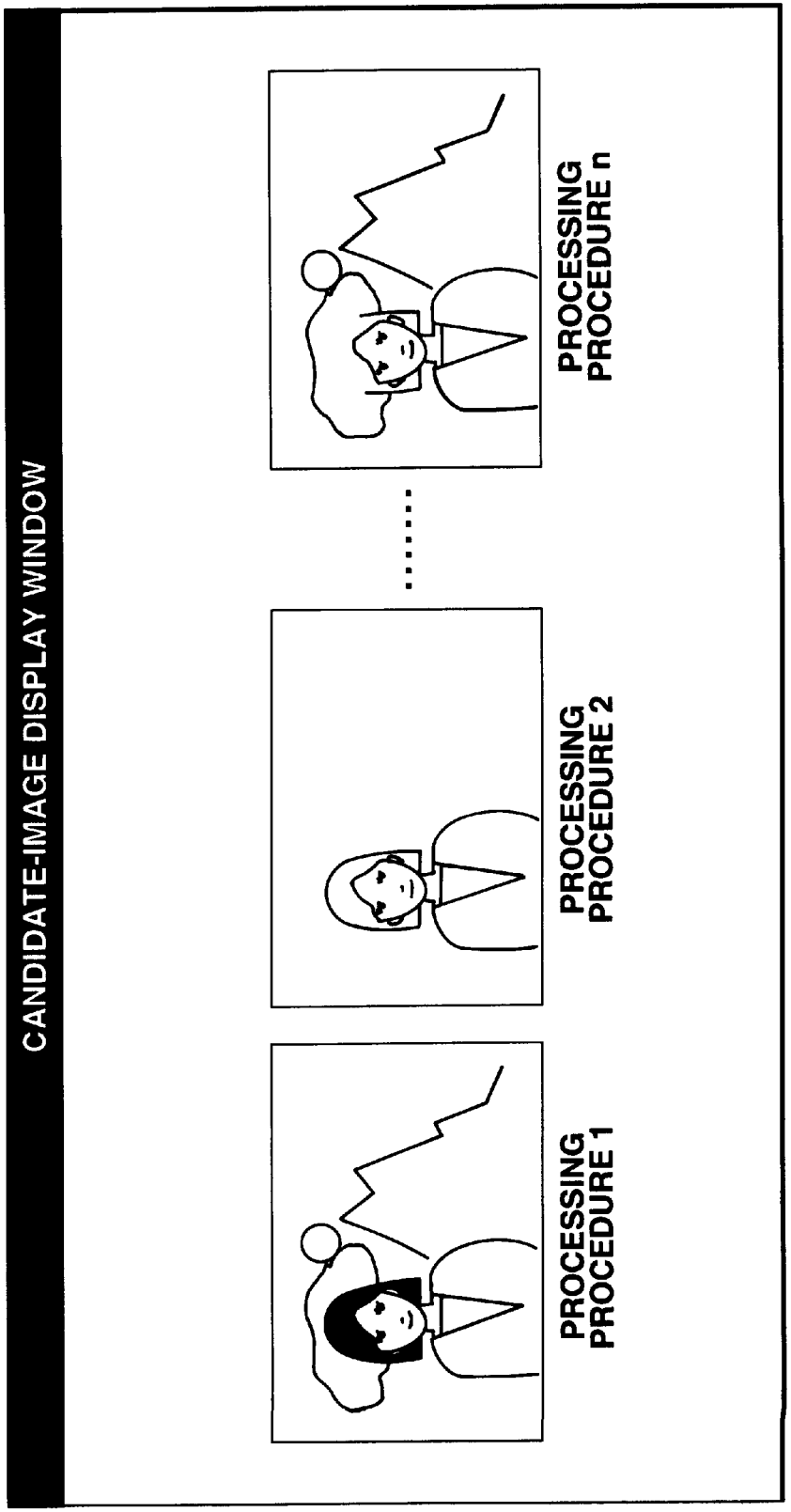

DOCUMENT EDITING SYSTEM AND METHOD

BACKGROUND OF THE INVENTION

1. Field of the Invention

This invention relates to a document editing system and method for editing a document including image data.

2. Description of the Related Art

In a conventional document editing system, a document which includes not only text data but also image data mixed in text data can be edited. Such a document editing system is realized by operating document-editing application software capable of mixing image data in text data, in a personal computer.

FIG. 14 is a diagram illustrating a conventional document editing system. A description of the conventional document editing system is provided with reference to FIG. 14. In FIG. 14, blocks constituting the document editing system which are required for the system but are not directly necessary for describing the conventinal system are not illustrated.

In FIG. 14, reference numeral 301 represents the hardware of the document editing system. The hardware 301 includes a display device 304 including a display unit, such as a CRT (cathode-ray tube), a video board, an input device 306 such as a mouse, a keyboard, a main storage device 307 such as a DRAM (dynamic random access memory) and the like, and a secondary storage device 308 which is a nonvotatile storage device such as a hard-disk drive and hard disks.

An operating system 302 performs total control for effectively utilizing the hardware 301 and an application software group 303 in the document editing apparatus. The operating system 302 simultaneously executes a plurality of application software, such as Windows®95 which is an operating system of the Microsoft®Corporation, and simultaneously displays a plurality of windows, serving as user interfaces of respective applications, on the display device 304.

In the operating system 302, a drawing control system 314 displays requested characters, figures, images or other information on the display device 304 in response to a request from certain application software included in the application software group 303. An input-device control system 315 transmits the user's event input via the input device 306 to an appropriate software module of the system. A memory control system 316 controls reading/writing of data from/to the main storage device 307. A filing system 317 controls files in the secondary storage device 308.

An inter-application communication function 318 allows data transmission/reception between applications within the application software group 303, start of another application, and the like. The OLE2 technology of the Microsoft Corporation is a typical inter-application communication technique. In the application software group 303, reference numeral 319 represents a document editing application. The document editing application 319 is configured by a data preserving/reading function 322 for preserving and reading document data edited by the user, an image-editing-result displaying function 323 for receiving display data of an image edited in an image editing application 321 from the image editing application 321 by inter-application communication, and displaying the display data on the display device 304 by asking the drawing control system 314, and an image-editing-application starting function 324 for starting the image editing application 321 by inter-application communication in response to a command input from the user, and other functions which are not clearly shown in FIG. 14, such as a text-data editing function and the like.

An image filing application 320 facilitates retrieval of a large number of files stored in the secondary storage device 308. The image filing application 320 transmits image data of an image data file assigned by the user from among an image data file group 330 of the secondary storage device 308 to the document editing application 319 and the image editing application 321 by inter-application communication function 318 in accordance with the user's assignment. The image editing application 321 performs image processing, such as gradation, color adjustment and the like, for an original image, and image editing, such as drawing of a figure in the original image, and the like. The image editing application 321 is configured by an image-data mapping function 325 for mapping an image received from the image filing application 320 onto the existing image; a data preserving/reading function 326 for writing/reading image data to/from the secondary storage device 308; a user-interface controlling function 327 for controlling display of an image, menus, the framework of an application, and the like on the display device 304, and the user's event from the input device 306; an image editing function group 328 including a plurality of image editing functions, such as the provision of various kinds of image processing filters for gradation, luminance adjustment, color adjustment and the like; and the provision of drawing tools for lines, characters and the like; an image-editing executing function 331 for executing an image editing function from among the image editing function group 328 in accordance with the user's input command; and other functions which are not shown in FIG. 14.

In the above-described configuration, in the OLE2 technology, an image editing application present at the side of supplying data by inter-application communication is called an "OLE server", and a document editing application present at the side of receiving data by inter-application communication is called an "OLE container".

Reference numeral 329 represents a document data file in the secondary storage unit 38, which is edited by the document editing application 319, and has a data structure as shown in FIG. 15. The document data shown in FIG. 15 is usually document data edited by the user, but may be a document supplied from the software developer provided as a sample when word-processor software is purchased.

In FIG. 15, a header-data storing portion 401 stores information, such as the font and colors of each text, the size of a sheet when printing the text, the direction of writing of the text (vertically written or horizontally written), and the like. A text-data storing portion 402 stores text data input by users or the software developer. An image-editing-application-data storing portion 403 (for storing "objects" in the OLE2 technology) includes an image-editing-application-identifying-information storing portion 404 for uniquely recognizing the image editing application for supplying image data by inter-application communication, an image-position-data storing portion 405 for storing information relating to the position and the size of image data in the document data, a display-data storing portion 406 for storing image data to be displayed on the display device 304, and an image-data storing portion 407 for storing image data to be used by the image editing application assigned by the image-editing-application-identifying-information storing portion 404 (image data of a format not supported by the document editing application may be started, this image data being also called "native data" in the OLE2 technology, which data is not limited to image data).

Reference numeral 408 represents a portion for storing other data which are not important in the description of the conventional system. When a plurality of images are included within a document, the storing portion 408 includes image-editing-application-data storing portions corresponding to the plurality of images.

In current image editing applications, samples of document data files having a structure as shown in FIG. 15 are, in most cases, included in the application software. The user can easily form a high-quality document without starting the entire design from scratch by correcting a text in one of such sample documents and replacing images.

FIG. 16 illustrates a user interface picture surface of the conventional document editing application 319 displayed on the display device 304.

In FIG. 16, a window 501 serves as the frame of the document editing application 319. Reference numeral 502 represents a document 1 which includes a text which is input through the input device 306, such as a keyboard, by the user or included by the developer, and an image received by inter-application communication by the image editing application 321 started as the OLE server and displayed on a image display region 503. Reference numeral 504 represents a "Save" button for inputting a command to preserve edited document data as a file. Reference numeral 505 represents an "Open" button for opening a document file on the window 501 to provide a state of capable of being edited. An "Insert Object" button 506 is used for inputting a command to insert an object of another OLE server application in the document (the term "object" in this embodiment conforms to the definition in the OLE2 technology).

FIG. 17 illustrates a user interface picture surface of the image filing application 320 displayed on the display device 304. In FIG. 17, a summary of image files retrieved according to keyword retrieval or the like from among the image data file group 330 stored in the secondary storage unit 308 is displayed. A window 601 serves as the frame of the image filing application. Reference numeral 602 represents a reduced-image display area for the retrieved image file.

FIG. 18 illustrates a user interface picture surface of the image editing application 321 for supplying image data to another application as the OLE server in the document editing system.

In FIG. 18, reference numeral 701 represents the frame window of the image editing application. A window 702 displays image data being edited. Buttons 703–713 are used for inputting execution commands for the respective image editing functions constituting the image editing function group 328. Reference numeral 703 represents a button for requesting execution of gradation processing. When the user clicks this button using the mouse, the image editing application 321 performs gradation processing (processing for degraded spatial resolution of an image) for the image data displayed in the window 702.

Reference numeral 704 represents a button for requesting execution for sharpening processing. When the user clicks this button using the mouse, the image editing application 321 performs sharpening processing (processing for sharpening edges of the image) for the image data displayed in the window 702. Reference numeral 705 represents a button for requesting execution of luminance adjusting processing. When the user clicks this button using the mouse, the image editing application 321 performs luminance adjusting processing (processing for appropriately correcting the luminance of the image) for the image data displayed in the window 702. Reference numeral 706 represents a button for requesting execution of color adjustment processing. When the user clicks this button using the mouse, the image editing application 321 performs color adjustment processing (processing for appropriately adjusting colors of the image) for the image data displayed in the window 702.

Reference numeral 707 represents a button for requesting execution of background removal processing. When the user clicks this button using the mouse, the image editing application 321 performs background removal processing (processing for removing the background of a personal image or the like) for the image data displayed in the window 702. Reference numeral 709 represents a button for requesting execution of logo processing. When the user clicks this button using the mouse, the image editing application 321 performs logo processing (processing for forming a logo by segmenting a character portion from an image including characters together with a photographed object and then decorating the characters) for the image data displayed in the window 702.

Reference numeral 710 represents a button for requesting execution of noise provision processing. When the user clicks this button using the mouse, the image editing application 321 peforms noise provision processing (processing for providing the image with noise to form a pictorial image) for the image data displayed in the window 702. Reference numeral 711 represents a button for requesting execution of deformation processing. When the user clicks this button using the mouse, the image editing application 321 performs deformation processing (processing for deforming the image) for the image data displayed in the window 702. Reference numeral 712 represents a button for requesting execution of reversal processing. When the user clicks this button using the mouse, the image editing application 321 performs reversal processing (processing for reversing the luminance of the image) for the image data displayed in the window 702.

In the conventional document editing system having the above-described configuration, when the user performs double clicking of the image 503 within the document using the mouse, the image-editing-application starting function 324 of the document editing application 319 starts the image editing application 321 for supplying image data as the OLE server application by uniquely recognizing the image data by referring to the contents of the image-editing-application-identifying-information storing portion 404, and makes the image display region 503 a user interface region of the image editing application 321.

When being started as the OLE server by the OLE container application, the image editing application 321 provides a state in which the user interface control function 327 accepts a mouse input from the user by making the image display region 503 its own user interface region, and adds predetermined menus necessary for image editing to a menu display region 507. In the OLE2 technology, a state in which the image editing application 321 is started within the container application in the above-described manner is called an "in-place active" state.

FIG. 19 illustrates a manner in which the image editing application 321 is started in the in-place active state within the document editing application 319. In the in-place active state shown in FIG. 19, hatching is displayed around the image display region 503, and predetermined menus for command inputs to the image editing application 321 are displayed on the menu display region 507 to provide a command-input waiting state.

On the other hand, when the image editing application 321 selects an arbitrary image by assigning a reduced-image display area for the image in the image filing application 320 in the in-place active state by depressing a mouse button, drags the selected image and drops it onto the image display region of the document editing application 319 using the mouse, the image filing application 320 transmits image data of the selected file to the image editing application 321 having been started in the in-place active state. Upon reception of the image data, the image-data mapping function 325 of the image editing application 321 maps the received image on the image displayed on the image display region 503.

FIG. 20 illustrates a state in which the image of file2.bmp shown in FIG. 17 is mapped on the original image. When the user performs mouse click of an arbitrary menu from among the image editing menus 703–712 displayed on the menu display region 507 in this state, the image-editing executing function 331 selects the image editing function corresponding to the menu subjected to a mouse click from among the image editing function group 328, and executes image editing for the image data displayed on the image display region 503.

When the user performs a mouse click of an arbitrary position other than the image display region 503 within the window 501 of the document 1 after the execution the image editing, the image editing application 321 changes from the in-place active state into an inactive state. At that time, the image editing application 321 transmits display data as the result of editing the document by editing application 319.

On the other hand, the document editing application 319 displays the received image data as the result of editing in the image display region 503. In the document editing application 319, when the necessity to preserve data arises, for example, by the user's input of a command to request to preserve data, the data preserving/reading function 322 of the document editing application 319 preserves corresponding data of the document in the header-data storing portion 401 and the text-data storing portion 402, and requests the image editing application 321 to preserve data in the image-editing-application-data storing portion 201.

In response to this request, the data preserving/reading function 326 of the image editing application 321 preserves data in the image-editing-application-data storing portion 201 in the form shown FIG. 15.

However, the conventional document editing system is very difficult to deal with for a user who is unfamiliar with image editing, and has the following problems:

(1) Since the image editing application started from the document editing application as the OLE server displays predetermined menus, a large number of menus are displayed in order to deal with all images for all kinds of document data. There is a great burden on the user to select an image editing function suitable for the image to be edited on the document being edited.

(2) Since image data includes a large amount of imformation, the image data occupies a large area of the storage medium, and accordingly a large amount of time is required for reading/writing of data from/to the recording medium. In order to overcome such a problem, it is necessary to store image data in small a size as possible. When the object of the use of the image data is uncertain, it is impossible to reduce the image size because the required resolution of the image is not known. On the other hand, image data in a document can be reduced to an optimum size based on a required resolution because it is known how the image is used in the document. However, in the conventional document editing system, it is necessary for the user to determine alone whether or not an image is to be reduced, and the size of the reduced image. This operation is very difficult for a user who is unfamiliar with image editing.

SUMMARY OF THE INVENTION

The present invention has been made in consideration of the above-described problems.

It is an object of the present invention to provide a document editing system and method in which an image is easily edited, even by a user who is unfamiliar with image editing.

According to one aspect, the present invention which achieves the above-described object relates to a document editing system for editing image data in document data, including a document-data preservation unit for preserving document data in a data structure including a recommended-image-size storing portion for storing information relating to a recommended image size, and a processing-script storing portion for storing al least one processing script describing image editing to be performed for the image data, and an image-data processing unit for processing the image data based on the data structure preserved in the document-data preservation unit.

According to another aspect, the present invention which achieves the above-described object relates to a document editing method for editing image data in document data, including the step of processing the image data based on a data structure for document data including a recommended-image-size storing portion for storing information relating to a recommended image size, and a processing-script storing portion for storing al least one processing script describing image editing to be performed for the image data.

According to still another aspect, the present invention which achieves the above-described object relates to a storage medium, which is read by a computer, for storing a computer program for realizing a document editing method for editing image data in document data, the method including the step of processing the image data based on a data structure for document data including a recommended-image-size storing portion for storing information relating to a recommended image size, and a processing-script storing portion for storing at least one processing script describing image editing to be performed on the image data.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 8(a) and 8(b) are diagrams illustrating processing-script data in the first embodiment;

FIG. 9 is a diagram illustrating a candidate-image display window;

DETAILED DESCRIPTION OF THE PREFERRED EMBODIMENTS

Preferred embodiments of the present invention are described in detail below with reference to the drawings.

(a) First Embodiment

Figure 1:
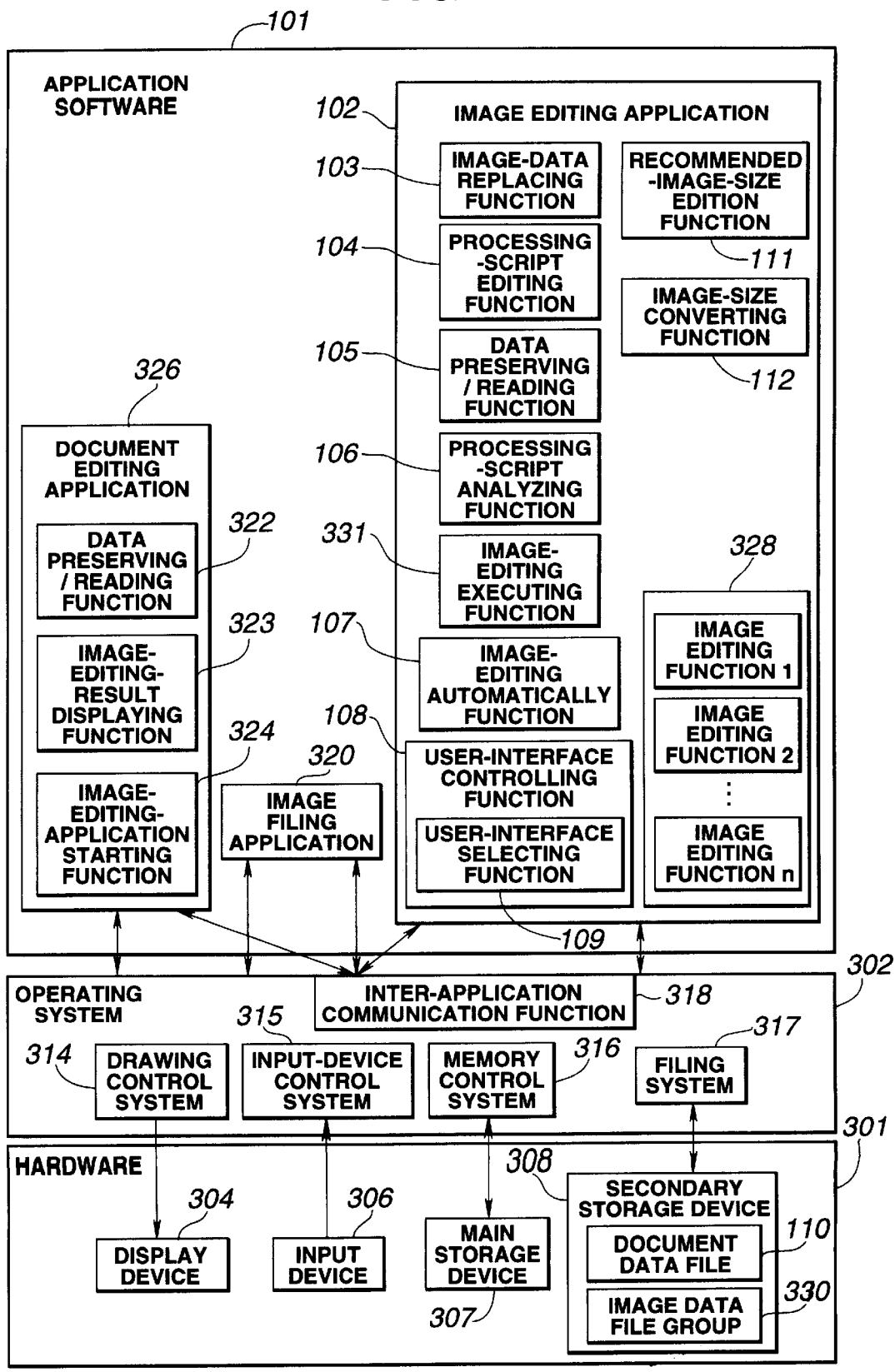
FIG. 1 is a diagram illustrating the basic configuration of a document editing system according to a first embodiment of the present invention.

FIG. 1 is a block diagram illustrating the basic configuration of a document editing system according to a first embodiment of the present invention.

The document editing system of the first embodiment is described with reference to FIG. 1. In FIG. 1, blocks constituting the document editing system which are required for the system but are not directly necessary for describing the first embodiment are not illustrated.

Figure 14:
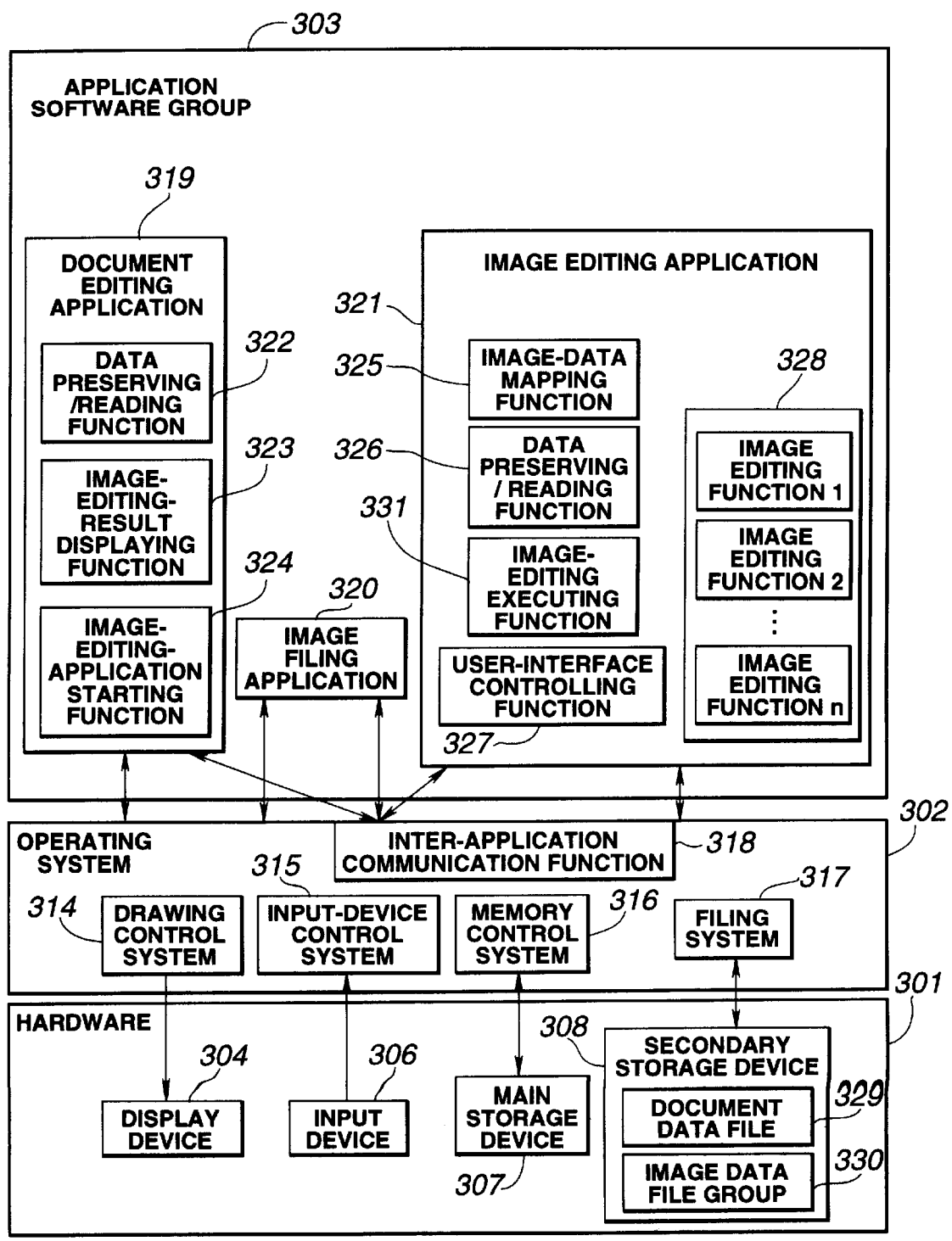
FIG. 14 is a diagram illustrating the basic configuration of a conventional document editing system.

In FIG. 1, reference numeral 301 represents the hardware of the document editing system as described with reference to FIG. 14. The document editing system 301 includes a display device 304, an input device 306, a main storage device 307, and a secondary storage device 308. Reference numeral 302 represents an operating system, which includes a drawing control system 314, an input-device control system 315, a memory control system 316, a filing system 317, and an inter-application communication function 318.

Reference numeral 101 represents an application software group. In the application software group 101, reference numeral 326 represents a document editing application which is the same as in the conventional system. Reference numeral 320 represents an image filing application which is the same as the conventional image filing application. An image editing application 102 performs image processing, such as gradation, color adjustment and the like, and image editing, such as drawing of a figure, for an image. The image editing application 102 is configured by an image-data replacing function 103, a processing-script editing function 104, a data preserving/reading function 105, a processing-script analyzing function 106, an image-editing executing function 331, an image-editing automatically executing function 107, a user-interface controlling function 108 including a user-interface selecting function 109, an image editing function group 328, a recommended-image-size editing function 111, an image-size converting function 112, and other functions which are not shown in FIG. 1 because they are not important for describing the first embodiment.

Figure 2:
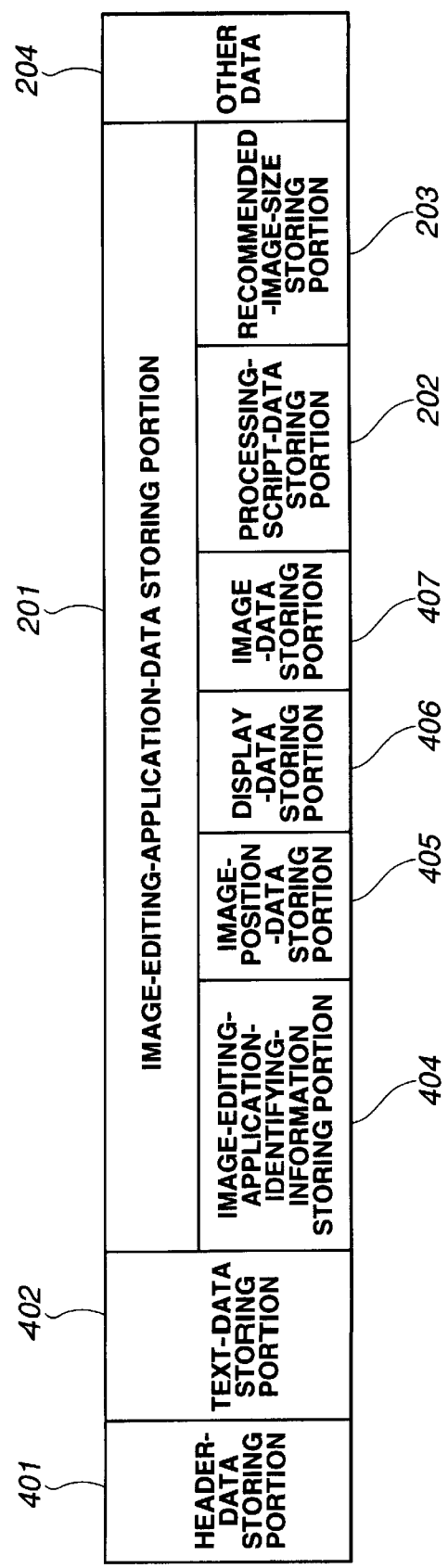
FIG. 2 is a diagram illustrating the structure of document data in the document editing system shown in FIG. 1.

A document data file 110 of the document editing system of the first embodiment has a data structure as shown in FIG. 2.

In FIG. 2, a header-data storing portion 401, a text-data storing portion 402, an image-editing-application-identifying-information storing portion 404, an image-position-data storing portion 405, a display-data storing portion 406 and an image-data storing portion 407 are the same as in the conventional document editing system.

Figure 15:
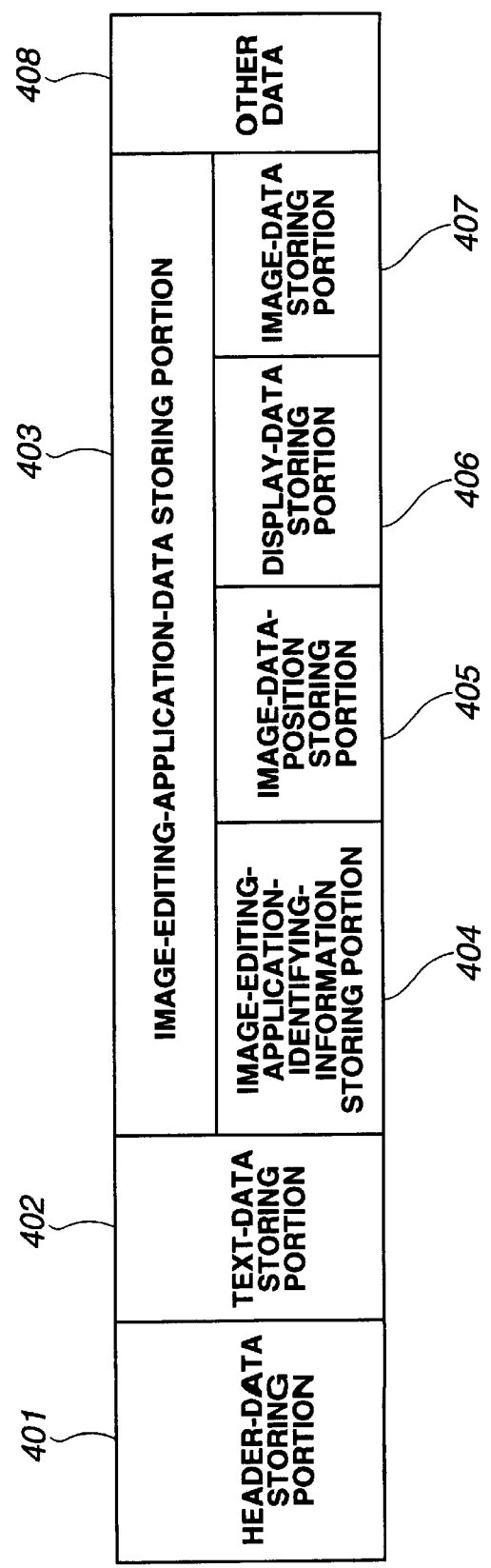
FIG. 15 is a diagram illustrating the structure of document data in the conventional document editing system shown in FIG. 14.

Reference numeral 201 represents an image-editing-application-data storing portion, which differs from that of the conventional document editing system shown in FIG. 15 in that a processing-script storing portion 202 for storing processing scripts describing how image data received from another application by inter-application communication is to be edited, and recommended-image-size storing portion 203 for storing information relating to a recommended image size to which image data received from another application by inter-application communication is to be resized are provided.

Reference numeral 204 represents a portion for storing other data, which includes, if a plurality of images are included in a document, image-editing-application-data storage units corresponding to the images.

In the above-described configuration, in the document editing system of the first embodiment, when a user which is unfamiliar with image editing edits document data as shown in FIG. 2 for which an operator who is familiar with image editing, such as the software developer of the image editing application, has input in advance a processing script using the processing-script editing function 104, if a command to replace image data is input to the image editing application 102 having been started as the OLE server of the document editing application 326, image data is first received by the inter-application communication function 318, and then the image-data replacing function 103 replaces the original image data with the received data.

Then, the image-size converting function 112 resizes the new image data to a recommended image size stored in the recommended-image-size storing portion 203. It is thereby possible to determine the minimum required image size conforming to the meaning of the image within the data structure of the concerned document data, and to remove a difficult operation of inputting a command to convert the image size from a menu.

Then, the processing-script analyzing function 106 of the image editing application 102 analyzes processing-script data stored in the processing-script storing portion 202. The user-interface selecting function 109 of the user-interface controlling function 108 selectively displays a minimum user interface required for performing image editing indicated by the processing-script data, or dynamically generates and displays a minimum user inteface required for performing image editing indicated by the processing-script data.

It is thereby possible to reduce the number of problems for a user, who is unfamilar with image editing, for selecting image editing adapted to the image to be edited in the document being edited from a large number of menus. When the processing script includes data for complete batch processing which provides no room of selection by the user, the image-editing automatically executing function 107 automatically performs image editing adapted to batch data of the processing script for the new image, so that a problem for the user of selecting and inputting an image editing command is removed.

Figure 16:
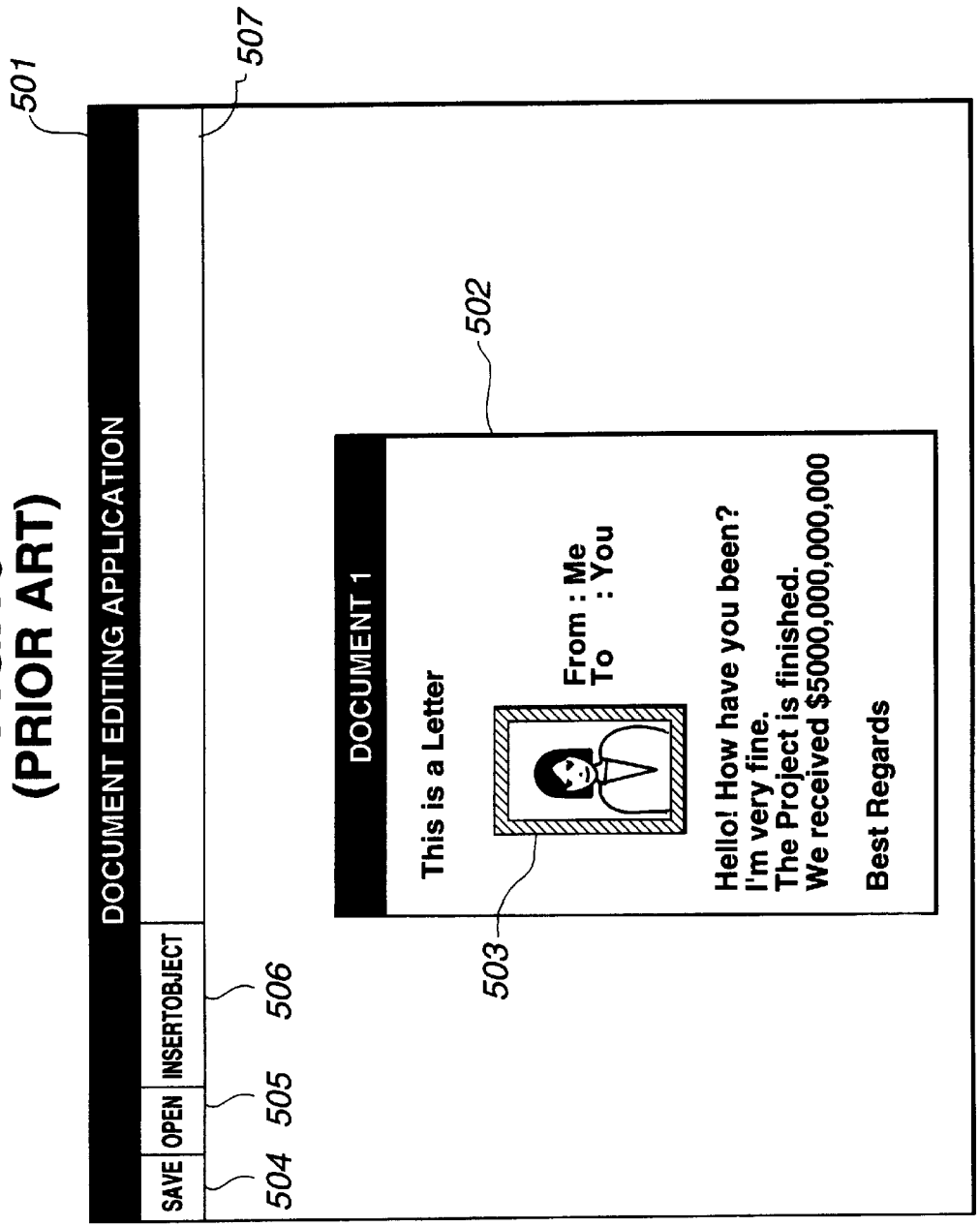
FIG. 16 is diagram illustrating a user interface picture surface of a document editing application in the conventional document editing system shown in FIG. 15.
Figure 17:
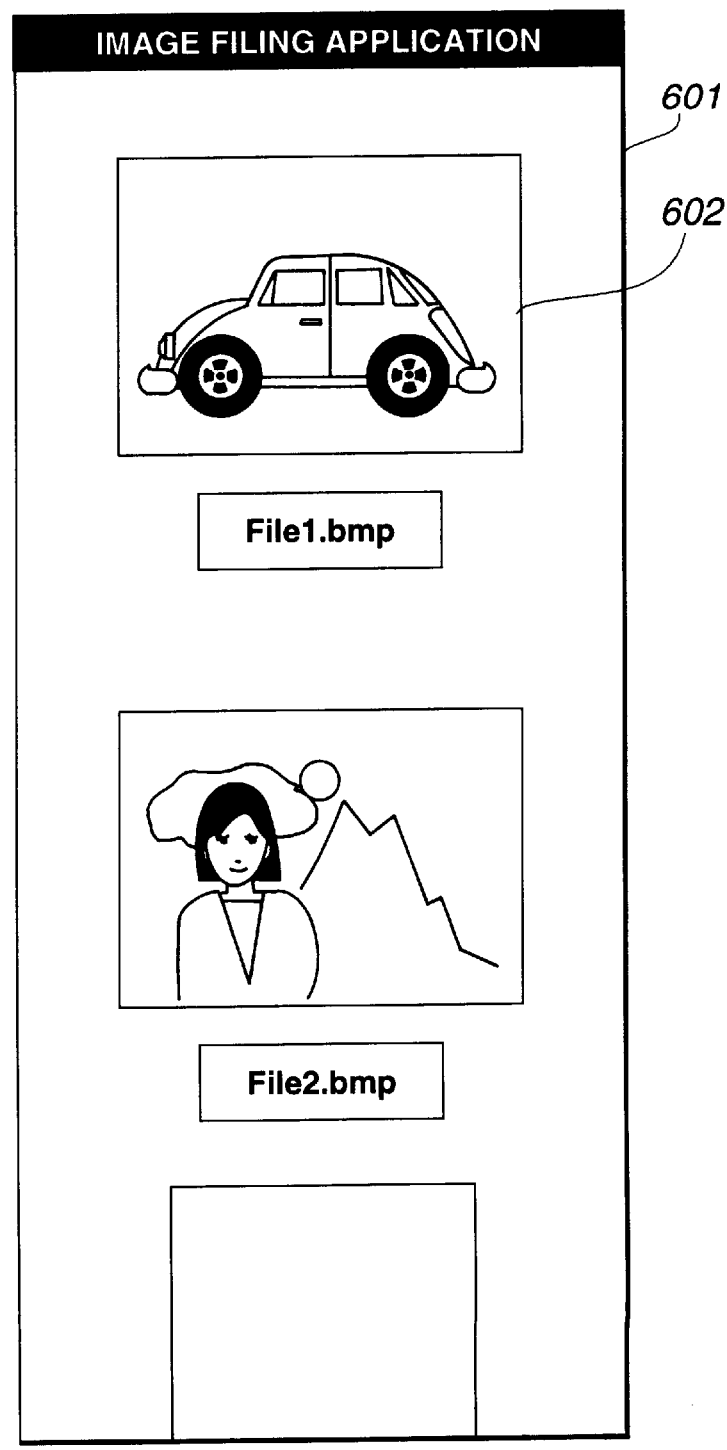
FIG. 17 is a diagram illustrating a user interface picture surface of an image filing application in the conventional document editing system shown in FIG. 15.
Figure 18:
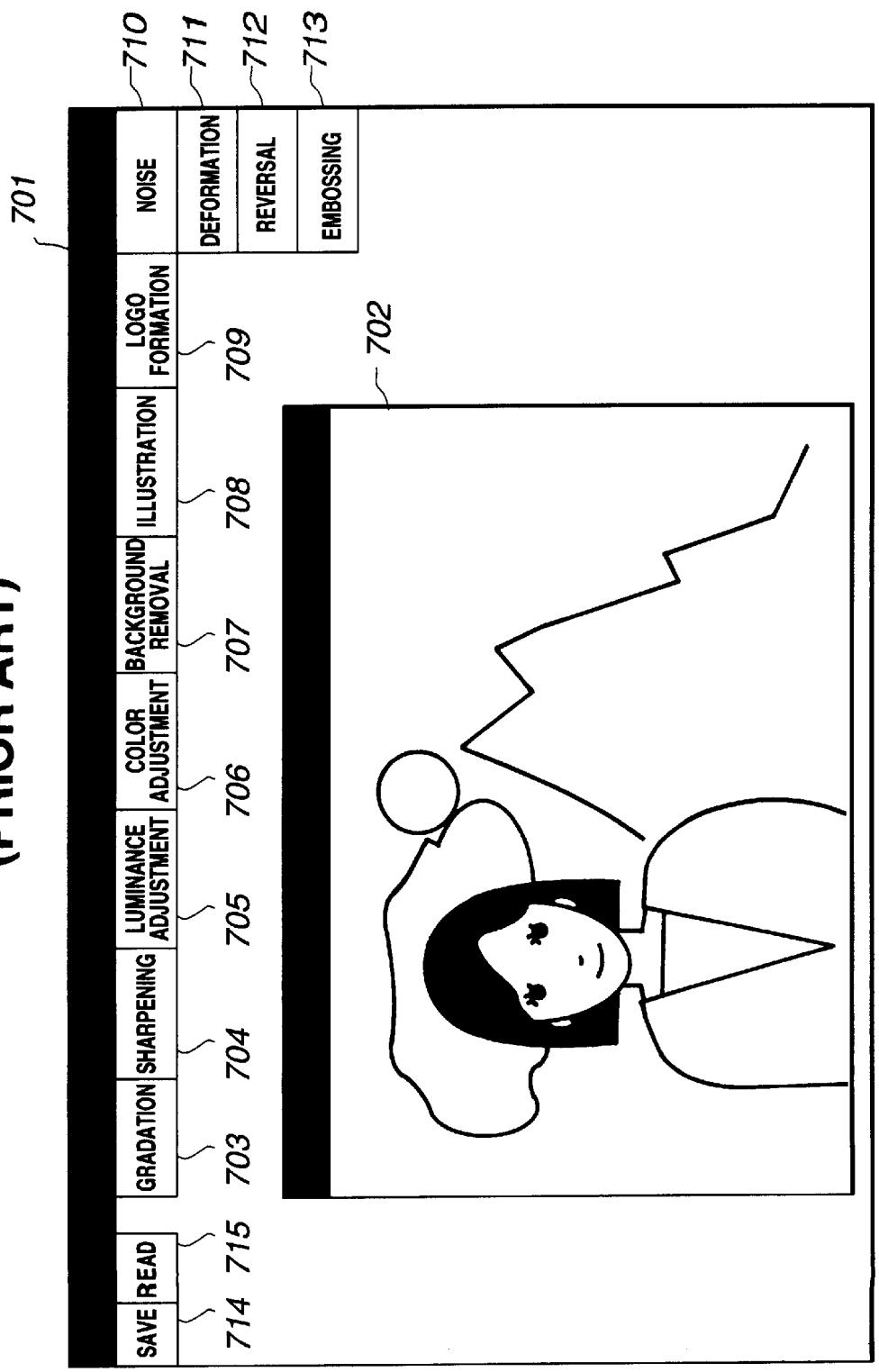
FIG. 18 is a diagram illustrating a user interface picture surface of an image editing application in the conventional document editing system shown in FIG. 15.

While the document 1 is edited in the document editing application as shown in FIG. 16, if the image display region 503 is subjected to a double click by a mouse pointer, the image-editing-application starting function 324 starts the image editing application 102. The flow of the processing of the document editing system in the first embodiment when starting the image editing application is described in detail below with reference to the memory map shown in FIG. 3 and the flowchart shown in FIG. 4.

Figure 3:
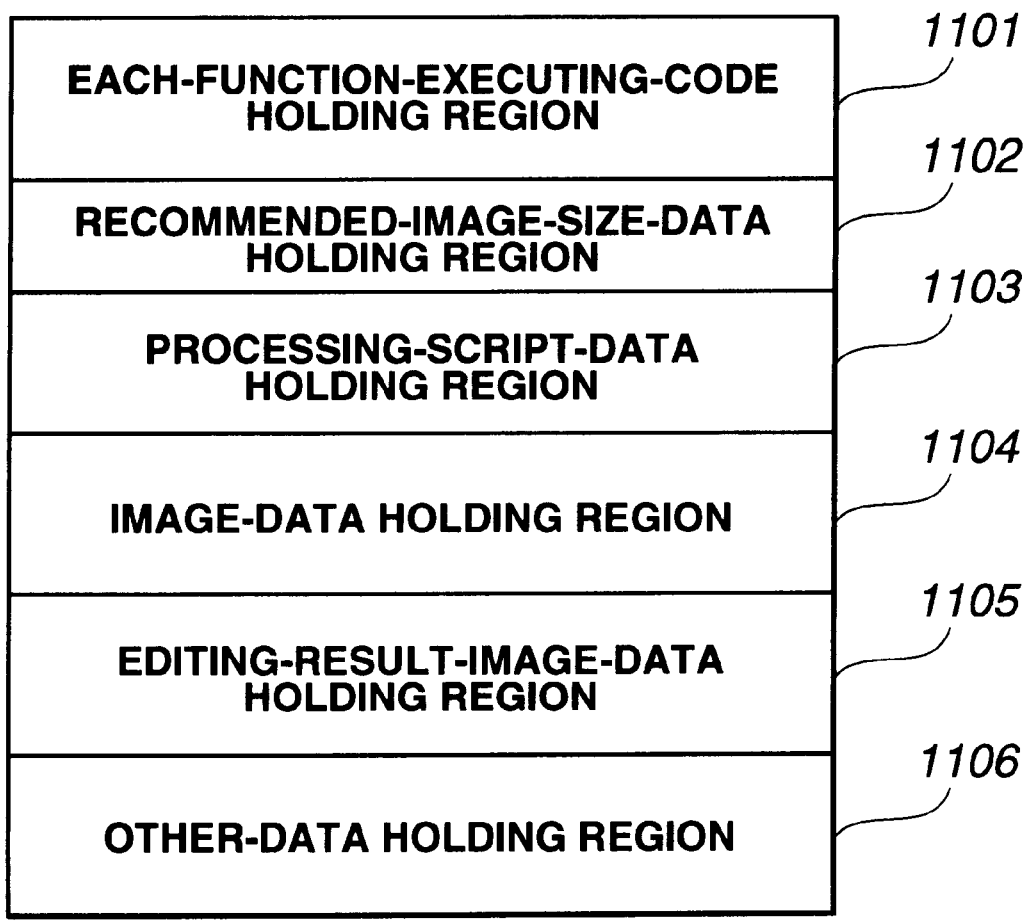
FIG. 3 is a diagram illustrating a memory map within a memory for an image editing application.

FIG. 3 illustrates a memory map within the memory region used by the image editing application 102 within the main storage device 307. Each-function-executing-code holding region 1101 includes the code of the executing form of each function of the image editing application 102. A recommended-image-size-data holding region 1102 holds data relating to a recommended image size. A processing-script-data holding region 1103 holds processing-script data. An image-data holding region 1104 holds the current image data. An editing-result-image-data holding region 1105 holds image data obtained as a result of image editing by each image editing function of the image editing function group 328. An other-data holding region 1106 holds other data which are not important in the description of the first embodiment.

Figure 4:
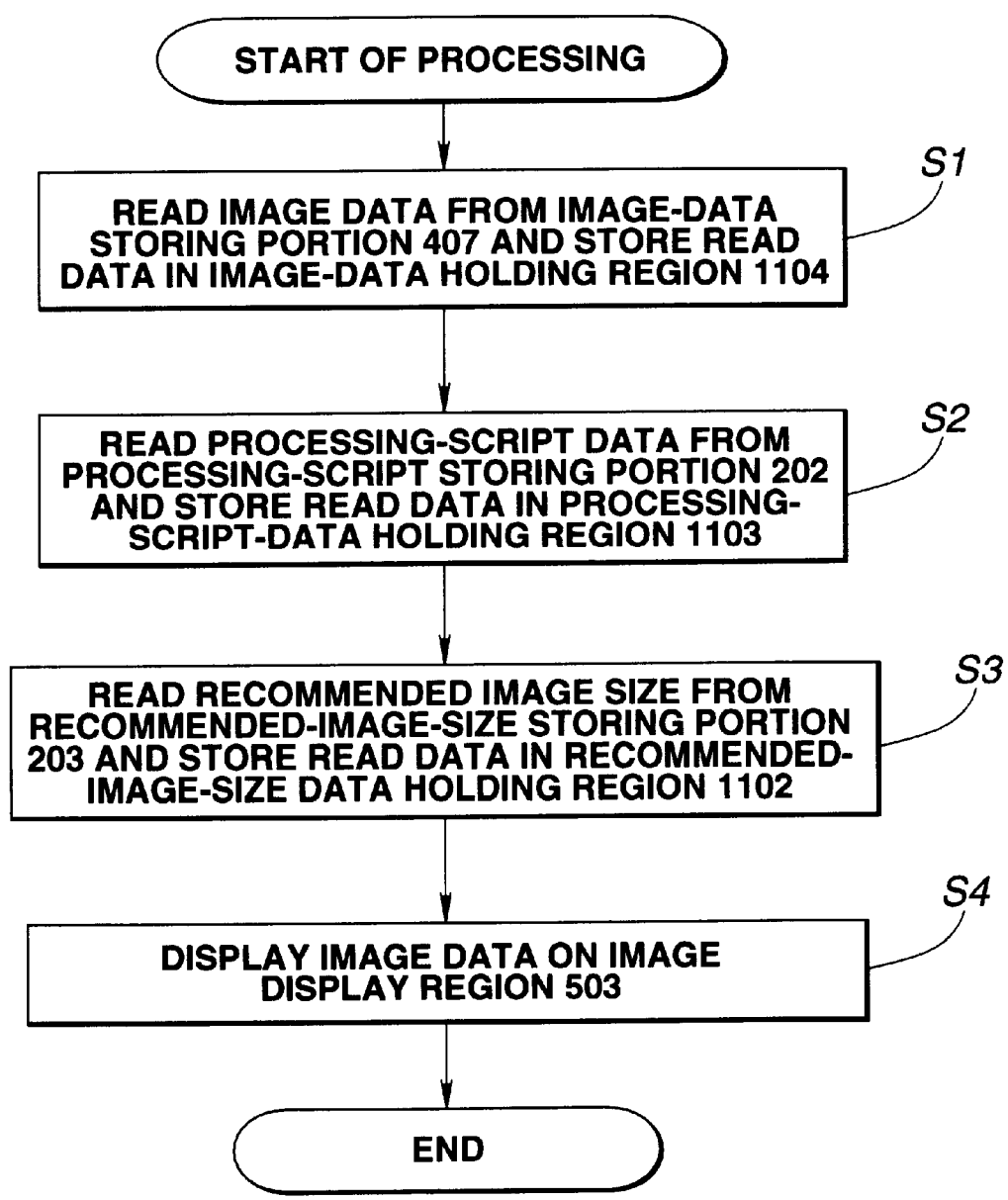
FIG. 4 is a flowchart illustrating processing procedures when the image editing application is started from a document editing application.

As shown in FIG. 4, the start of image editing application 102 starts processing from step S1. In step S1, the data preserving/reading function 105 reads image data from the image-data storing portion 407 and writes the read data in the image-data holding region 1104 (for the purpose of simplifying the description, it is assumed that image data of an image 1.bmp has been stored in the image-data storing portion 407).

Then, in step S2, the data preserving/reading function 105 reads processing-script data from the processing-script storing portion 202 and writes the read data in the processing-script-data holding region 1103. Then, in step S3, the data preserving/reading function 1105 reads a recommended image size from the recommended-image-size storing portion 203 and writes the read data in the recommended-image-size-data holding region 1102. Then, in step S4, the user-interface controlling function 108 displays image data held in the image-data holding region 1104 on the image display region 503 within the document, and the start of processing is terminated.

Figure 5:
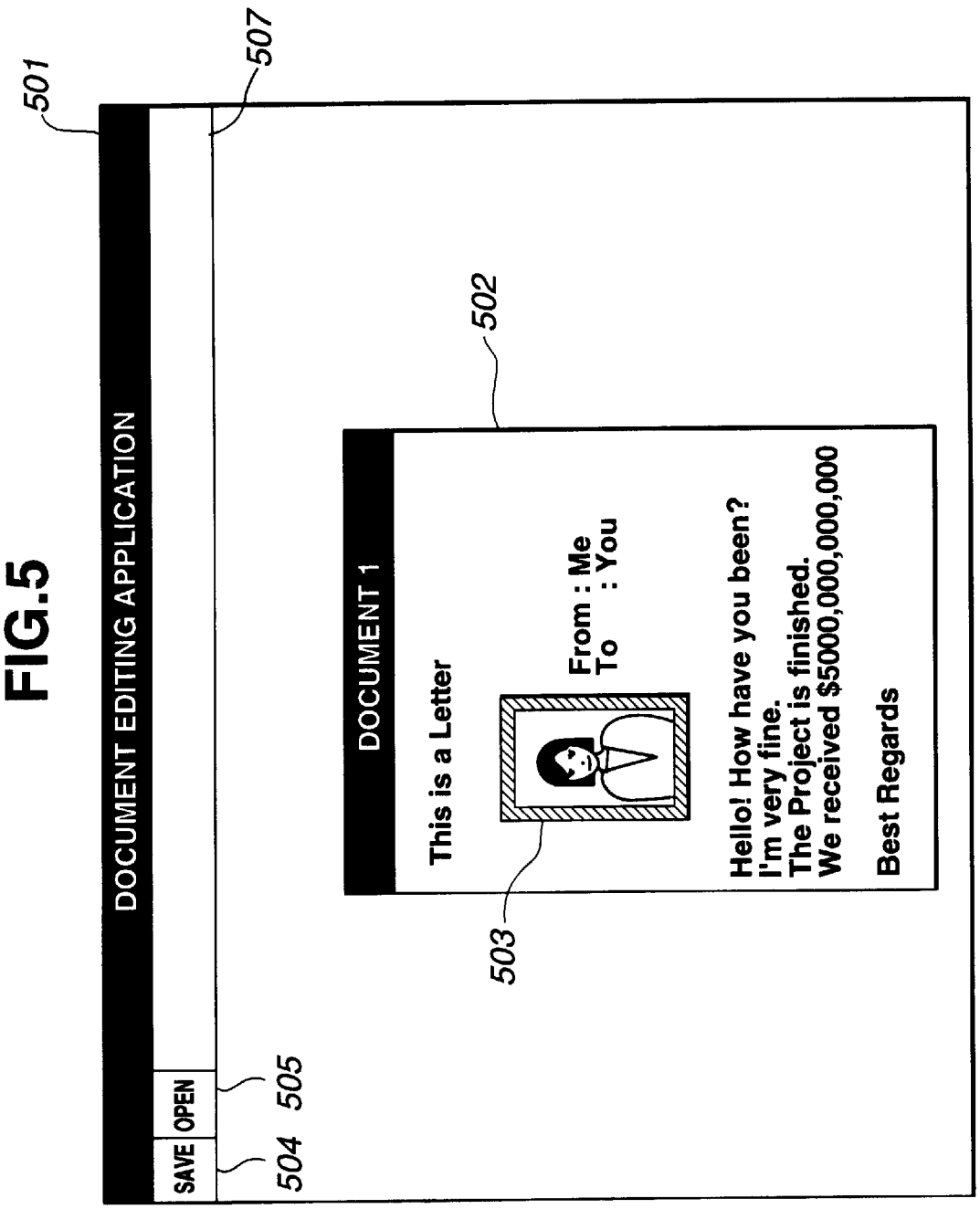
FIG. 5 is a diagram illustrating a display on a display device 304 shown in FIG. 1 in an in-place active state.

Upon completion of the start of processing, the image editing application 102 awaits an event (a command input) from the user in the in-place active state within the document editing application 326. FIG. 5 illustrates a display on the display device 304 in this state.

Figure 19:
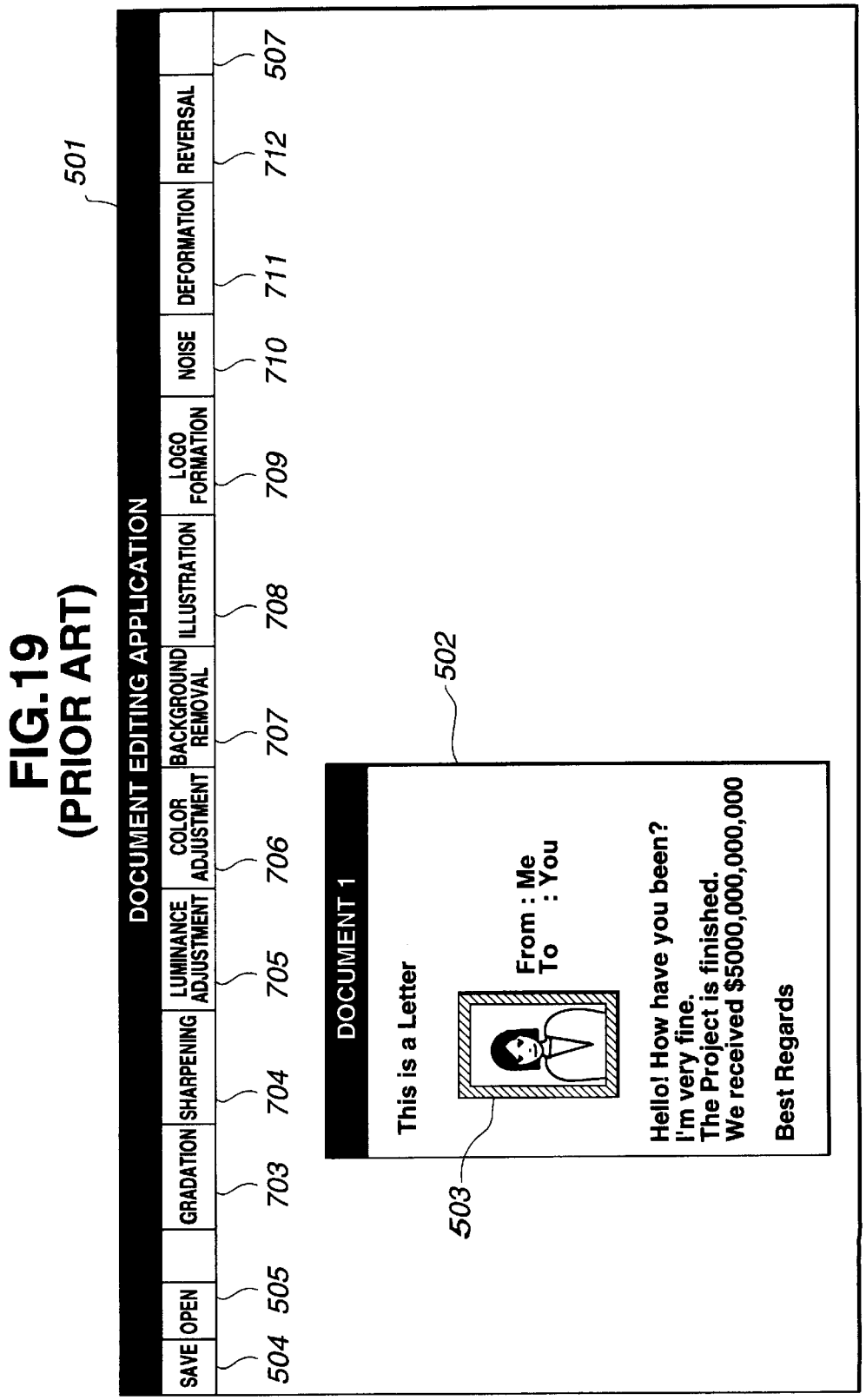
FIG. 19 is a diagram illustrating a user interface picture surface of a document editing application and an image editing application in the conventional document editing system shown in FIG. 15.
Figure 20:
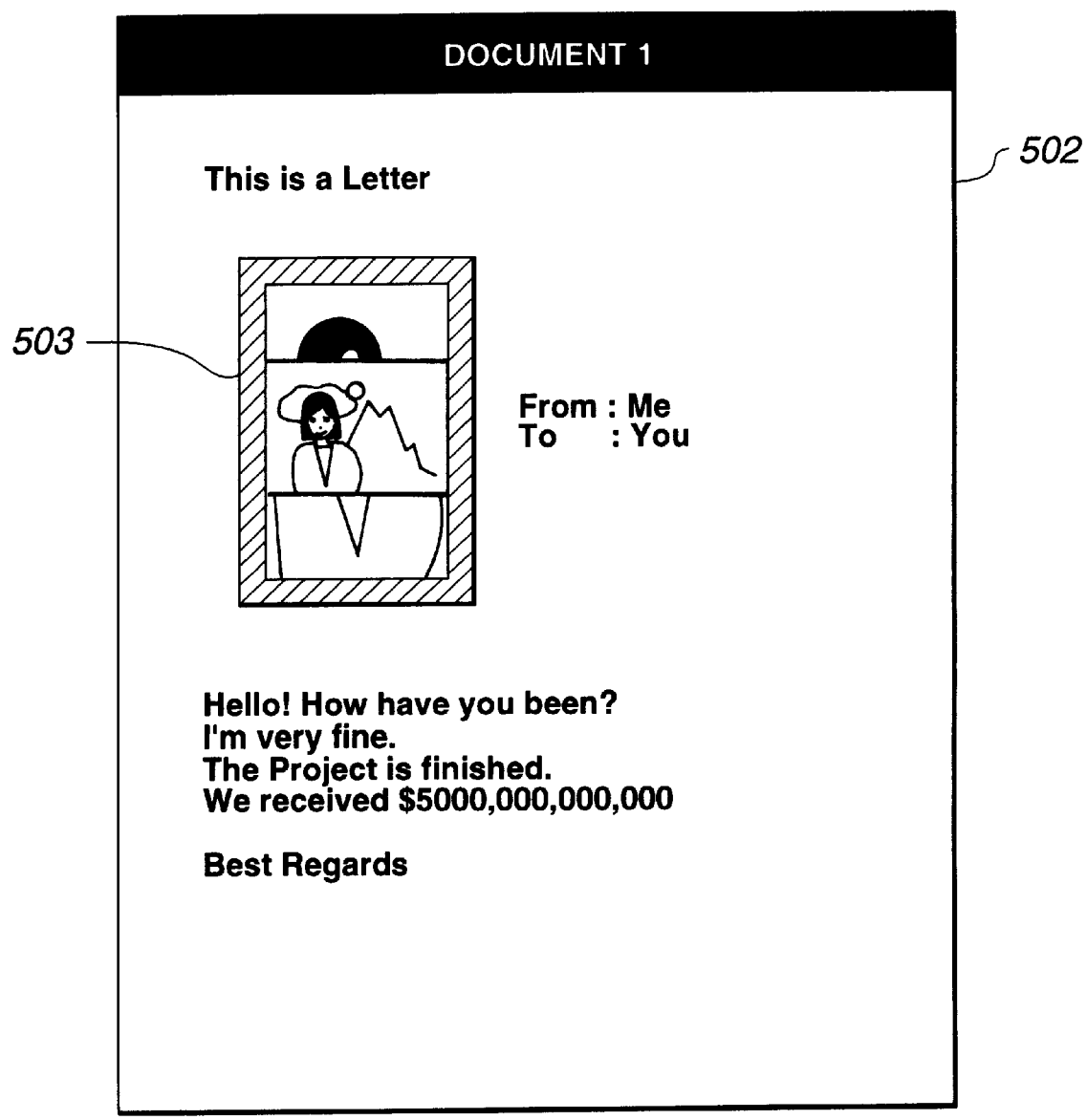
FIG. 20 is a diagram illustrating a state of mapping an image according to a drag-and-drop operation in the conventional document editing system shown in FIG. 15.

As shown in FIG. 5, in contrast to the case shown in FIG. 19, the user-interface controlling function 108 of the image editing application 102 in the first embodiment does not provide menus for inputting image editing commands in the menu display region 507 of the document editing application.

Figure 6:
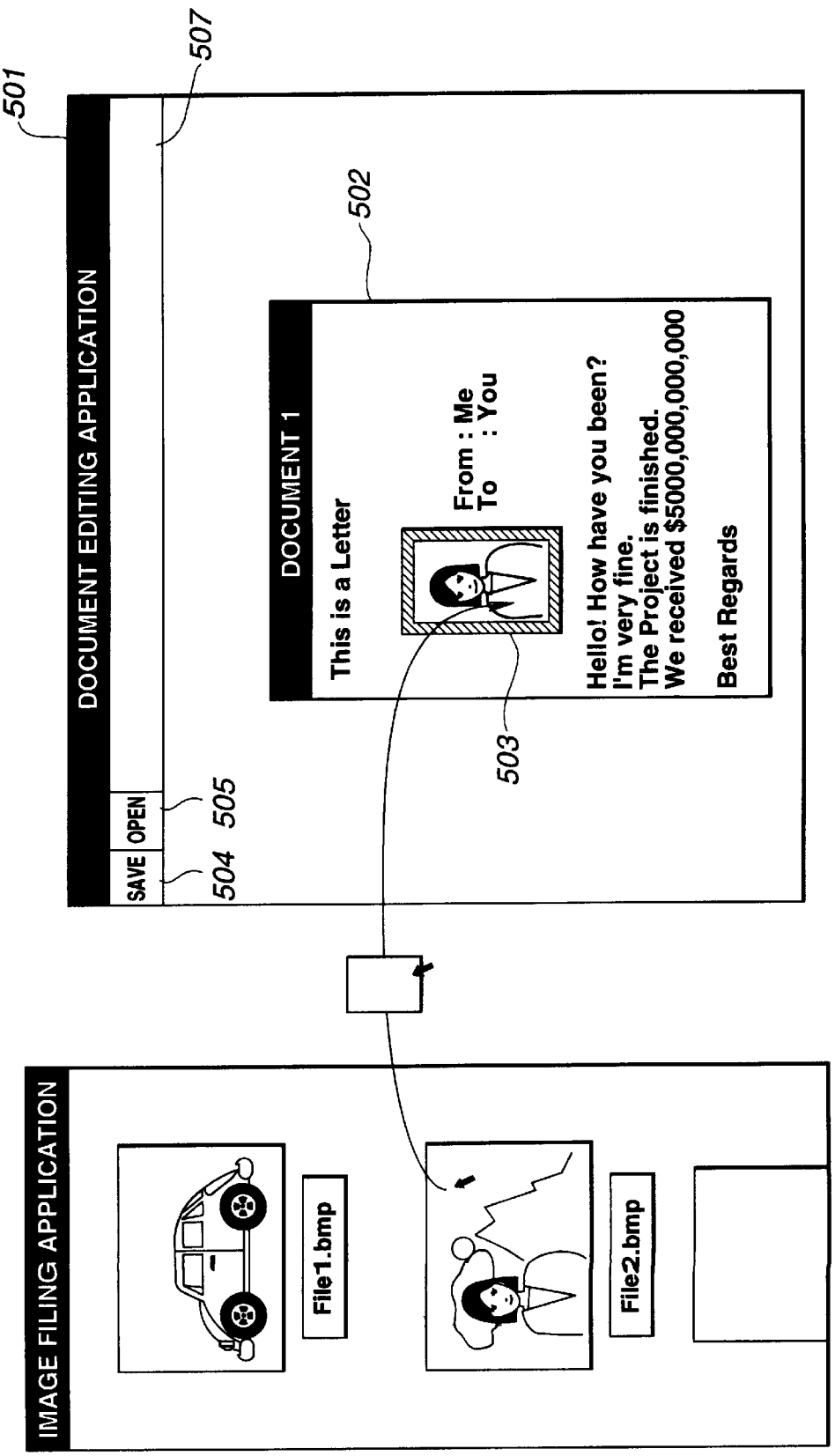
FIG. 6 is a diagram illustrating a state of inputting a command for transmitting image data by inter-application communication.

FIG. 6 illustrates a state in which a command to transmit image data is input from the image filing application 320 to the image editing application 102 by inter-application communication. In FIG. 6, an operation of moving a mouse cursor onto an image to be transmitted (file2.bmp) on the image filing application, depressing a mouse button, and moving the mouse cursor onto the image display region 503 and then releasing the mouse button (an operation generally called "drag and drop") is shown.

In this document editing system, by performing a drag-and-drop operation from a reduced image in the image filing application 320 onto the image editing application in the in-place active state within the document editing application in the above-descrived manner, it is possible to input an image-data transmission command to the inter-application communication function 318.

Figure 7:
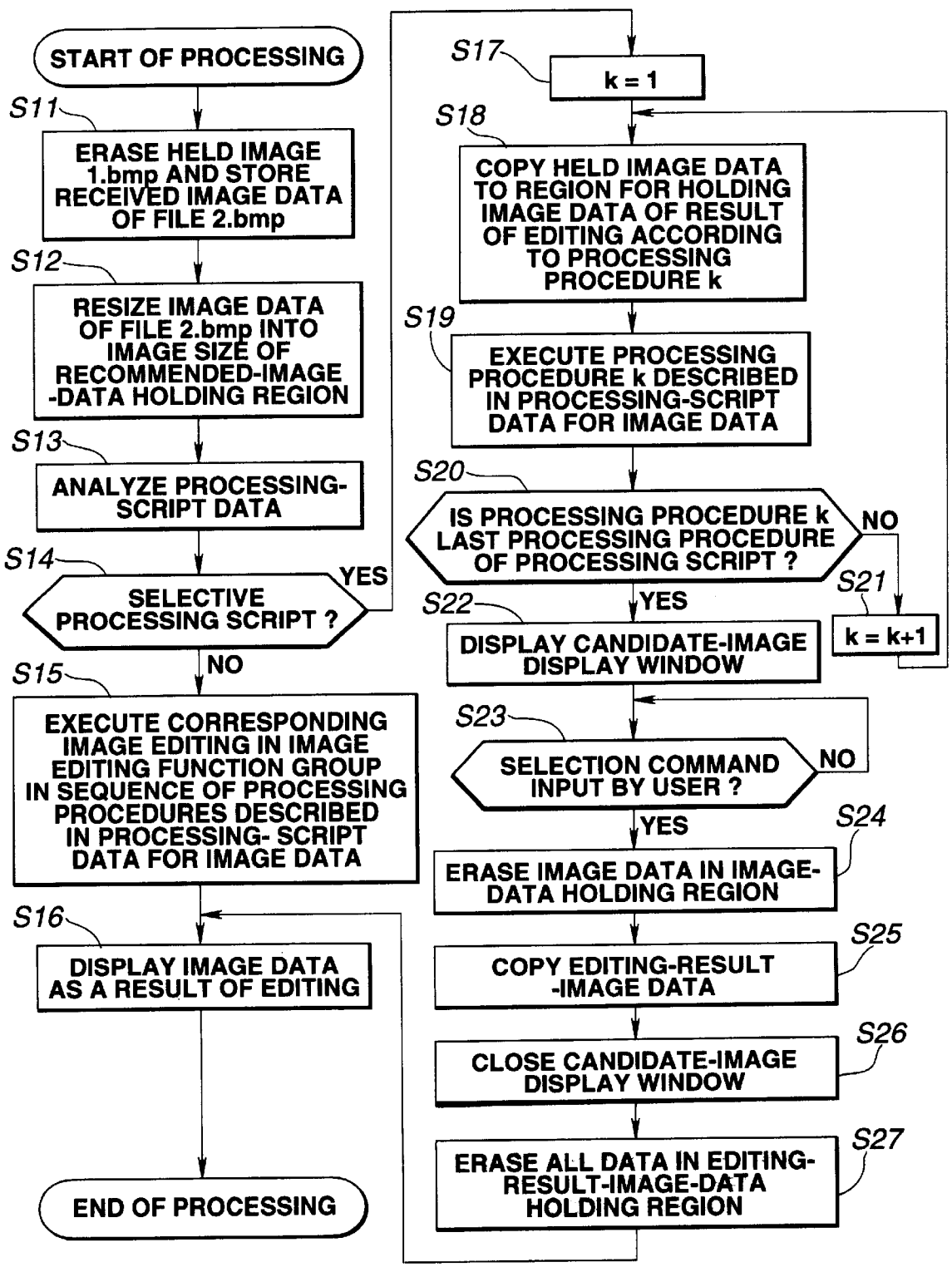
FIG. 7 is a flowchart illustrating processing procedures by the document editing system shown in FIG. 1.

Processing procedures starting from the user's input of an image-data transmission command is described in detail with reference to the flowchart shown in FIG. 7, illustrating a case of performing a drag-and-drop operation of image data of file2.bmp to the image editing application 102.

In the document editing system of the first embodiment, when the user inputs an image-data transmission command by a drag-and-drop operation, image data is received by inter-application communication, and processing is started from step S11 shown in FIG. 7.

First, in step S11, the image-data replacing function 103 replaces image data of an image 1.bmp held in the image-data holding region 1104 by erasing the 1.bmp image data and storing image data of file2.bmp received by inter-application communication in the image-data holding region 1104 in place of the erased 1.bmp image data.

Then, in step S12, the image-size converting function 112 resizes the image data (of file2.bmp) held in the image-data holding region 1104 into the recommended image size stored in the recommended-image-size holding region 1102.

Next, in step S13, the processing-script analyzing function 106 analyzes processing-script data stored in the processing-script-data holding region 1103. FIGS. 8(a) and 8(b) illustrate examples of processing-script data. In FIG. 8(a), two processing procedures, i.e., processing procedure 1 and processing procedure 2, are illustrated.

More specifically, processing procedure 1 illustrates a processing script indicating gradation processing performed for the original image by setting parameter 1 to 10, and illustration processing performed for an image obtained as the result of the gradation processing by setting parameter 1 to 20. Processing procedure 2 illustrates processing script indicating sharpening processing performed for the original image by setting parameter 1 to be 10, and noise processing performed for an image obtained as the result of the sharpening processing by setting parameter 1 and parameter 2 to be 15 and 30, respectively.

As described above, in the processing script shown in FIG. 8(a), a plurality of processing procedures are illustrated. Such a processing script is termed a "selective processing script". On the other hand, in the processing script shown in FIG. 8(b), only one processing procedure is illustrated. Such a processing script is termed a "nonselective processing script".

In step S14, it is determined whether the processing script is selective or nonselective based on the result of the analysis in step S13. When the processing-script data stored in the processing-script-data holding region 1103 is selective as in the case of FIG. 8(*a*), the process proceeds to step S17. When the processing-script data is nonselective, the process proceeds to step S15.

When the processing script is nonselective and the process proceeds to step S15, in step S15, the image-editing automatically executing function 107 retrieves an image editing function corresponding to the processing procedure described in the processing-script data for image data (of file2.bmp as resized in step S12) stored in the image-data holding region 1104, and executes the retrieved function. Parameters used when executing each image-editing function conforms to the description of the processing-script data.

Then, in step S16, the user-interface controlling function 108 displays image data obtained as a result of editing conforming to the processing script stored in the image-data holding region 1104 on the image display region 503, and the processing procedures shown in the flowchart of FIG. 7 are terminated.

Figure 10:
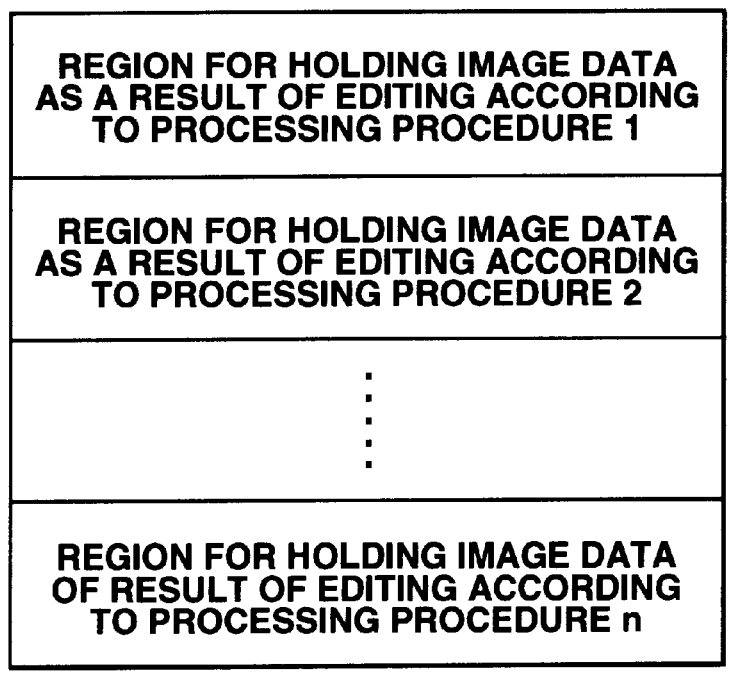
FIG. 10 is a diagram illustrating a memory map in an editing-result-image-data holding region.

When the processing script is selective and the process proceeds to step S17, first, in step S17, a value 1 is entered in a counter k. Then, in step S18, image data (of file2.bmp as resized in step S12) stored in the image-data holding region 1104 is copied to a region for holding image data as a result of editing according to processing procedure k shown in FIG. 10.

Then, in step S19, the image-editing automatically executing function 107 executes processing procedure k described in the processing-script data for the image data stored in the region for holding image data as a result of editing according to processing procedure k. When executing processing, the image editing function corresponding to processing procedures described in processing procedure k is retrieved from the image editing function group 328, and the retrieved function is executed. Parameters when executing each image editing function conform to the description of processing procedure k.

Next, in step S20, it is determined if processing procedure k is the last processing procedure in the processing-script data. For example, when the processing script is as shown in FIG. 8(*a*), processing procedure 2 is the last processing procedure of the processing script. Hence, the result of the determination in step S20 becomes affirmative when k=2, and the process proceeds to step S22. If the result of the determination in step S20 is negative, the process proceeds to step S21, where the value of the counter k is incremented by one, and the process returns to step S18. In step S22, a candidate-image display window as shown in FIG. 9 is displayed. As shown in FIG. 9, in the candidate-image display window, an image obtained as the result of editing operations according to processing procedures 1–n stored in the editing-result-image-data storing region 1105 is displayed.

The user can select a preferred editing-result image from the candidate-image display window. In the first embodiment, a command to select a preferred editing-result image is input by moving the mouse cursor onto the preferred image and clicking the mouse button. In step S23, it is determined if a selection command is input by the user. The result of the determination remains "No" until a selection command is input, and the determination of step S23 is repeated.

When the user has input a selection command by performing mouse click, the result of the determination in step S23 becomes "Yes", and the process proceeds to step S24. In step S24, the image data stored in the image-data holding region 1104 is erased. Then, in step S25, image data as the result of editing according to the processing procedure selected by the user is copied from the editing-result-image-data holding region 1105 to the image-data holding region 1104. Then, in step S26, the candidate-image display window shown in FIG. 9 is closed. Then, in step S27, all image data as results of processing according to processing procedures 1–n stored in the editing-result-image-data storing region 1105 are erased. After performing the processing in step S16, the processing shown in the flowchart of FIG. 7 is terminated.

After completing image editing processing by the image editing application 102, by a mouse click of a portion other than the image display region 503 within the window 502 of the document 1 performed by the user, the image editing application changes from the in-place active state into the nonactive state. It is necessary that the image editing application preserves data processed in the in-place active state before changing to the nonactive state. Hence, the image editing application preserves recommended-image-size data, processing-script data and editing-result-image data in the recommended-image-size storing portion 203, the processing-script storing portion 202 and the image-data storing portion 407, respectively. At the same time, the image editing application forms display data and stores the formed data in the display-data storing portion 406. On the other hand, the image-editing-result displaying function 323 of the document editing application 326 displays the display data stored in the display-data storage unit 406 on the image display region 503.

As described above, in the document editing system of the first embodiment, when inputting a command to replace the image by a drag-and-drop operation performed by the user, if the processing script is nonselective, image editing is automatically performed without user intervention, thereby eliminating the problem for a user, who is unfamiliar with image editing, of having to input a plurality of commands and parameters for image editing. Even in the case of a selective processing script, image editing preferable for the user can be easily performed by an operation of only selecting a preferred image while observing a certain number of automatically edited images as a result of processing.

(b) Second Embodiment

Next, a description is provided of a second embodiment of the present invention.

Figure 12:
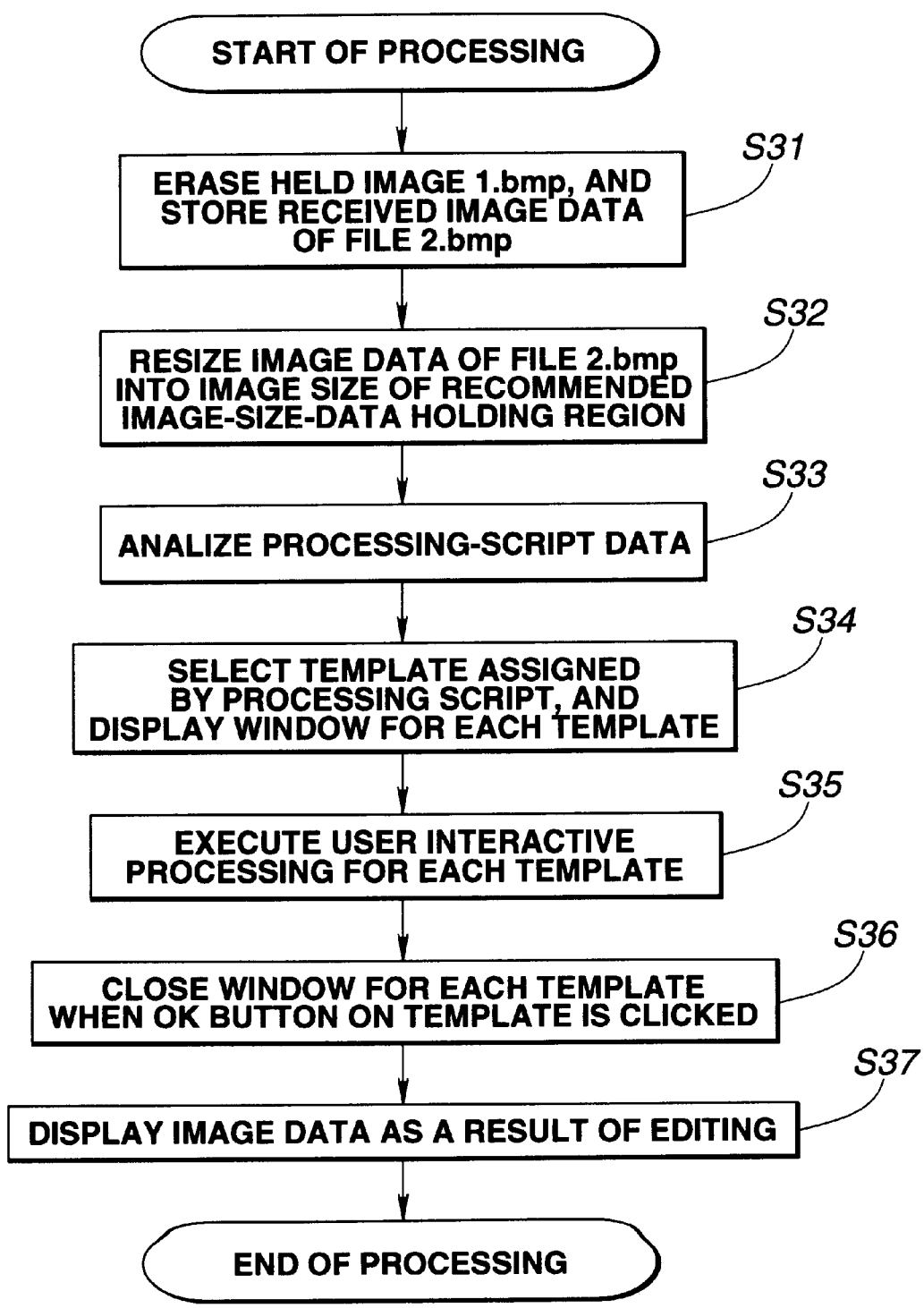
FIG. 12 is a flowchart illustrating processing procedures by a document editing system according to the second embodiment.

In a document editing system according to the second embodiment, when the image editing application 102 is in the in-place active state within the document editing application 326 (the state shown in FIG. 5), if the user inputs an image-data transmission command by a drag-and-drop operation as shown in FIG. 6, processing is started from step S31 as shown in the flowchart of FIG. 12.

First, in step S31, the image-data replacing function 103 replaces image data of an image 1.bmp held in the image-data holding region 1104 by erasing the 1.bmp image and storing image data of file2.bmp received by inter-application communication in the image-data holding region 1104 in place of the erased 1.bmp image data.

Then, in step S32, the image-size converting function 112 resizes the image data (of file2.bmp) held in the image-data holding region 1104 to the recommended image size stored in the recommended-image-size holding region 1102. Then, in step S33, the processing-script analyzing function 106 analyzes processing-script data stored in the processing-script-data holding region 1103.

Figure 11:
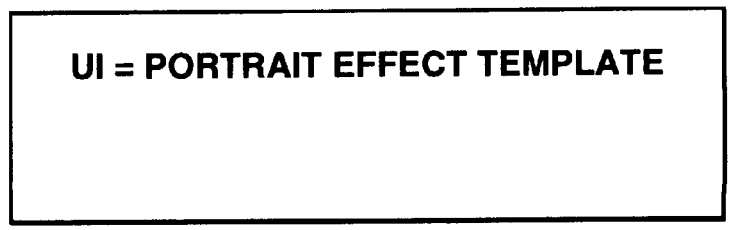
FIG. 11 is a diagram illustrating an example of processing-script data in a second embodiment of the present invention.

FIG. 11 illustrates an example of processing-script data in the second embodiment.

The processing script in the second embodiment describes the name of a template to be used in image editing. The template indicates a window in which only the user interface of a required image editing function from among a plurality of image editing functions included in the image editing function group 328 is picked up for each object of image editing.

The "portrait effect template" illustrated in the processing-script data shown in FIG. 11 is a window including a minimum user interface for achieving an object of image editing of "performing image editing of an image, where a person is photographed, into an image adapted to mapping of a photograph of the figure of a transmitter of a letter document". In the second embodiment, it is considered that removal of background and adjustment of luminance suffice for an image to be used as a photograph of the figure of the transmitter, and that the portrait effect template has a user interface as shown in FIG. 13.

Figure 13:
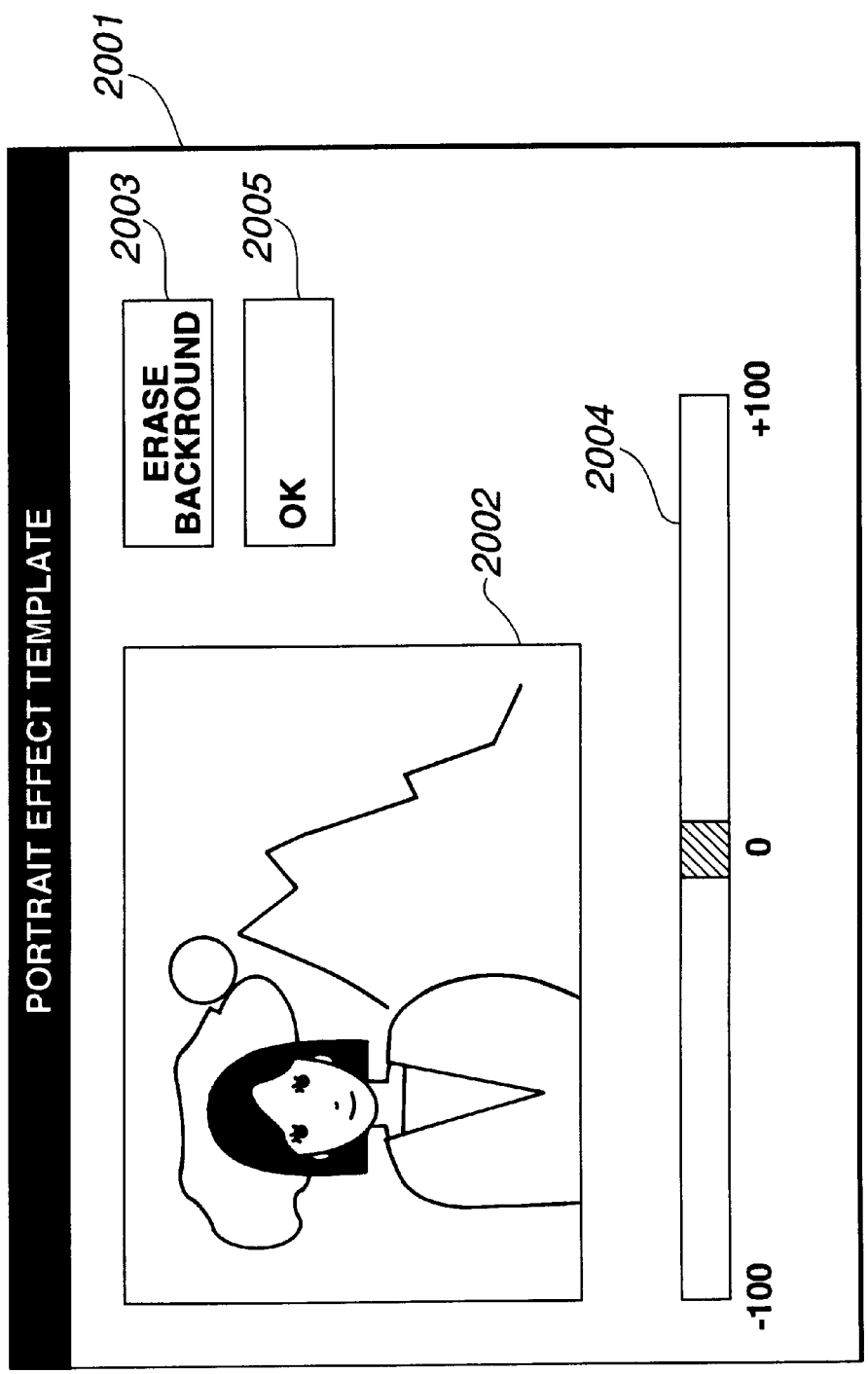
FIG. 13 is a diagram illustrating a window of a portrait effect template.

In FIG. 13, reference numeral 2001 represents a window for the portrait effect template. Reference numeral 2002 represents a region for displaying image data to be edited (image data stored in the image-data holding region 1104). Reference numeral 2003 represents a button for inputting a command to erase background. Reference numeral 2004 represents a slide bar for adjusting luminance. Luminance increases by sliding the slide bar 2004 to the right, and decreases by sliding the slide bar 2004 to the left. Reference numeral 2005 represents an OK button for inputting the end of image editing to the document editing system when the user is satisfied with the result of image editing.

In step S34, the user-interface selecting function 109 selects a template described in the processing script in accordance with the result of the analysis in step S33, and displays the selected template. For example, when the processing script assigns the portrat effect template as shown in FIG. 11, the window shown in FIG. 13 is displayed on the display device 304 of the document editing system of the second embodiment.

As described above, since the user-interface selecting function 109 selectively displays the minimum user interface adapted to the object, the user need not be concerned with the selection of a menu and it is possible to guide a user who is unfamiliar with image editing.

In step S35, image editing is performed for the image held in the image-data holding region 1104 by executing user interactive processing for each template via the window of the template. In step S36, when the user has terminated image editing by interactive processing and performed a mouse click of the OK button on the template, the window of the template is closed. In step S37, the user-interface controlling function 108 displays image data as the result of editing data stored in the image-data holding region 1104 on the image display region 503, and the series of processes shown in FIG. 12 are terminated.

As described above, in the document editing system of the second embodiment, instead of displaying predetermined menus or tools, the minimum user interface for achieving the object of image editing is selectively displayed in accordance with the description of the processing script. Hence, the difficulty that a user, who is unfamiliar with image editing, has in selecting a menu adapted to the object from among a plurality of image editing menus is minimized.

As described in detail above, according to the first and second embodiments, for example, when inputting a command to replace the image of a document including image data, if the processing script is nonselective, image editing is automatically performed without user intervention, thereby removing a problem for a user, who is unfamiliar with image editing, of inputting commands and parameters for image editing. Even in the case of a selective processing script, image editing preferable for the user is easily performed by an operation of only selecting a preferred image while observing a certain number of automatically edited images as a result of processing.

Furthermore, according to the first and second embodiments, instead of displaying predetermined menus or tools, by assigning, for example, a template by the processing script, the minimum user interface for achieving the object of image editing is selectively displayed in accordance with the description of the processing script. Hence, a problem for a user, who is unfamiliar with image editing, of selecting a menu adapted to the object from among a plurality of image editing menus is minimized.

The individual components shown in outline or designated by blocks in the drawings are all well-known in the document editing system and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A document editing system comprising:

document storage, adapted to store a document;

image region storage, adapted to store information of an image region in the document;

editing operation storage, adapted to store at least one editing operation which has been prepared in advance for editing images to be displayed in the image region;

an image input unit adapted to input an image;

an editing unit adapted to edit the input image based on the at least one editing operation stored in said editing operation storage; and a display controller, adapted to control display on a display screen of the document and the edited image in the image region based on the stored information of the image region.

2. A document editing system according to claim 1, further comprising:

size storage, adapted to store the size of the image region; and a resizing unit, adapted to resize the image based on the size of the image region.

3. A document editing system according to claim 1, further comprising:

a window display unit, adapted to display of a first window and a second window on the display screen;

a controller, adapted to cause display of the document having the image region in the first window and display of a plurality of images in the second window; and a selector, adapted to select an image from the images displayed in the second window, wherein said input unit inputs the image selected by said selector into the image region.

4. A document editing system comprising:

document storage, adapted to store a document;

image region storage, adapted to store information of an image region in the document;

editing operation storage, adapted to store a first kind of editing operation and a second kind of editing operation;

an image input unit, adapted to input an image;

an editing unit, adapted to edit the input image based on the first kind of editing operation and the second kind of editing operation stored in said editing operation storage, respectively;

a selector, adapted to select an image from the edited images; and a display controller, adapted to display on a display screen the document and the selected image in the image region based on the stored information of the image region.

5. A document editing system according to claim 4, further comprising:

size storage, adapted to store the size of the image region; and a resizing unit, adapted to resize the image based on the size of the image region.

6. A document editing system according to claim 4, further comprising:

a window display unit, adapted to display a first window and a second window on the display screen; and a controller, adapted to cause display of the document having the image region in the first window and display of the edited images in the second window, wherein said selector selects an image from the image displayed in the second window.

7. A document editing system comprising:

document storage, adapted to store a document;

image region storage, adapted to store information of an image region in the document;

editing operation storage, adapted to store at least one editing operation which has been prepared in advance for editing an image to be displayed in the image region;

an image input unit, adapted to input an image;

an editing tool display unit, adapted to display at least one editing tool based on the at least one editing operation;

an editing unit, adapted to edit the input image in accordance with an instruction by the at least one editing tool; and a display controller, adapted to cause display on a display screen of the document and of the edited image in the image region based on the stored information of the image region.

8. A document editing system according to claim 7, further comprising:

size storage, adapted to store the size of the image region; and a resizing unit, adapted to resize the image based on the size of the image region.

9. A document editing system according to claim 4, further comprising:

a window display unit, adapted to display the first window and the second window on said display screen; and a controller, adapted to cause display of the document having the image region in the first window and display of the input image and the at least one editing tool in the second window.

10. A document editing method comprising:

a document storage step, of storing a document;

an image region storage steps of storing information of an image region in the document;

an editing operation storage step, of storing at least one editing operation prepared in advance for editing images to be displayed in the image region;

an image input step, of inputting an image;

an editing steps of editing the input image based on the at least one editing operation stored in said editing operation storage step; and a display control step, of displaying on a display screen the document and the edited image in the image region based on the stored information of the image region.

11. A document editing method according to claim 10, further comprising:

a size storage steps of storing the size of the image region; and a resizing step, of resizing the image based on the size of the image region.

12. A document editing method according to claim 10, further comprising:

a window display step, of displaying a first window and a second window on the display screen;

a control step, of displaying the document having the image region in the first window and displaying a plurality of images in the second window; and a selection step, of selecting an image from the images displayed in the second window, wherein said input step includes inputting the image selected in said selection step into the image region.

13. A document editing method comprising:

a document storage step, of storing a document;

an image region storage step, of storing information of an image region in the document;

an editing operation storage step, of storing in advance a first kind of editing operation and a second kind of editing operation;

an image input step, of inputting an image;

an editing step, of editing the input image based on the first kind of editing operation and the second kind of editing operation stored in said editing operation storage step, respectively;

a selecting step, of selecting an image from the edited images; and a display control step, of displaying on a display screen the document and the selected image in the image region based on the stored information of the image region.

14. A document editing method according to claim 13, further comprising:

a size storage step, of storing the size of the image region; and a resizing step, of resizing the image based on the size of the image region.

15. A document editing method according to claim 13, further comprising:

a window display step, of displaying a first window and a second window on the display screen; and a control step, of displaying the document having the image region in the first window and displaying the edited images in the second window, wherein said selecting step includes selecting an image from the image displayed in the second window.

16. A document editing method comprising:

a document storage step, of storing a document;

an image region storage step, of storing information of an image region in the document;

an editing operation storage step, of storing at least one editing operation prepared in advance for editing an image to be displayed in the image region;

an image input step, of inputting an image;

an editing tool display step, of displaying at least one editing tool based on the at least one editing operation;

an editing step, of editing the input image in accordance with an instruction by the at least one editing tool; and a display control step, of displaying on a display screen the document and the edited image in the image region based on the stored information of the image region.

17. A document editing method according to claim 16, further comprising:

a size storage step, of storing the size of the image region; and a resizing step, of resizing the image based on the size of the image region.

18. A document editing method according to claim 13, further comprising:

a window display step, of displaying the first window and the second window on said display screen; and a control step, of displaying the document having the image region in the first window and displaying the input image and the at least one editing tool in the second window.

19. A computer readable medium having recorded thereon codes for implementing a computer implementable document editing method comprising:

a document storage step, of storing a document;

an image region storage step, of storing information of an image region in the document;

an editing operation storage step, of storing at least one editing operation prepared in advance for editing images to be displayed in the image region;

an image input step, of inputting an image;

an editing step, of editing the input image based on the at least one editing operation stored in said editing operation storage means; and a display control step, of displaying on a display screen the document and the edited image in the image region based on the stored information of the image region.

20. A computer readable medium according to claim 19, wherein said document editing method further comprises:

a size storage step, of storing the size of the image region; and a resizing step, of resizing the image based on the size of the image region.

21. A computer readable medium according to claim 19, wherein said document editing method further comprises:

a window display step, of displaying a first window and a second window on the display screen;

a control step, of displaying the document having the image region in the first window and displaying a plurality of images in the second window; and a selection step, of selecting an image from the images displayed in the second window, wherein said input step includes inputting the image selected in said selection step into the image region.

22. A computer readable medium having recorded thereon codes for implementing a computer implementable document editing method comprising:

a document storage step, of storing a document;

an image region storage step, of storing information of an image region in the document;

an editing operation storage step, of storing in advance a first kind of editing operation and a second kind of editing operation;

an image input step, of inputting an image;

an editing step, of editing the input image based on the first kind of editing operation and the second kind of editing operation stored in said editing operation storage step, respectively;

a selecting step, of selecting an image from the edited images; and a display control step, of displaying on a display screen the document and the selected image in the image region based on the stored information of the image region.

23. A computer readable medium according to claim 22, wherein said document editing method further comprises:

a size storage step, of storing the size of the image region; and a resizing step, of resizing the image based on the size of the image region.

24. A computer readable medium according to claim 22, wherein said document editing method further comprises:

a window display step, of displaying a first window and a second window on the display screen; and a control step, of displaying the document having the image region in the first window and displaying the edited images in the second window, wherein said selecting step includes selecting an image from the image displayed in the second window.

25. A computer readable medium having recorded thereon codes for implementing a computer implementable document editing method comprising:

a document storage step, of storing a document;

an image region storage step, of storing information of an image region in the document;

an editing operation storage step, of storing at least one editing operation prepared in advance for editing an image to be displayed in the image region;

an image input step, of inputting an image;

an editing tool display step, of displaying at least one editing tool based on the at least one editing operation;

an editing step, of editing the input image in accordance with an instruction by the at least one editing tool; and a display control step, of displaying on a display screen the document and the edited image in the image region based on the stored information of the image region.

26. A computer readable medium according to claim 25, wherein said document editing method further comprises:

a size storage step, of storing the size of the image region; and a resizing step, of resizing the image based on the size of the image region.

27. A computer readable medium according to claim 22, wherein said document editing method further comprises:

a window display step, of displaying the first window and the second window on said display screen; and a control step, of displaying the document having the image region in the first window and displaying the input image and the at least one editing tool in the second window.

* * * * *

UNITED STATES PATENT AND TRADEMARK OFFICE
CERTIFICATE OF CORRECTION

PATENT NO.    : 6,202,073 B1
DATED         : March 13, 2001
INVENTOR(S)   : Fumiaki Takahashi Page 1 of 1

It is certified that error appears in the above-identified patent and that said Letters Patent is hereby corrected as shown below:

Drawings,
Sheet 11 of 19, FIG. 12, "ANALIZE" should read -- ANALYZE --.

Column 6,
Line 20, "al" should read -- at --; and
Line 32, "al" should read -- at --.

Column 5,
Line 51, "abut" should read -- about --;
Line 55, "layer" should read -- layers --.

Column 14,
Line 63, "of" should be deleted.

Column 16,
Line 5, "steps" should read -- step, --;
Line 11, "steps" should read -- step, --; and
Line 19, "steps" should read -- step, --.

Signed and Sealed this

Twenty-sixth Day of March, 2002

Attest:

*Attesting Officer*

JAMES E. ROGAN
*Director of the United States Patent and Trademark Office*